US 8,549,152 B2

(12) United States Patent
Elzur et al.

(10) Patent No.: US 8,549,152 B2
(45) Date of Patent: *Oct. 1, 2013

(54) SYSTEM AND METHOD FOR TCP/IP OFFLOAD INDEPENDENT OF BANDWIDTH DELAY PRODUCT

(75) Inventors: Uri Elzur, Irvine, CA (US); Frankie Fan, Diamond Bar, CA (US); Steven B. Lindsay, Mission Viejo, CA (US); Scott S. McDaniel, Villa Park, CA (US)

(73) Assignee: Broadcom Corporation, Irvine, CA (US)

( * ) Notice: Subject to any disclaimer, the term of this patent is extended or adjusted under 35 U.S.C. 154(b) by 528 days.

This patent is subject to a terminal disclaimer.

(21) Appl. No.: 12/813,186

(22) Filed: Jun. 10, 2010

(65) Prior Publication Data

US 2010/0250783 A1 Sep. 30, 2010

Related U.S. Application Data

(63) Continuation of application No. 11/963,105, filed on Dec. 21, 2007, which is a continuation of application No. 10/652,183, filed on Aug. 29, 2003, now Pat. No. 7,313,623.

(60) Provisional application No. 60/408,617, filed on Sep. 6, 2002, provisional application No. 60/607,165, filed on Aug. 30, 2002, provisional application No. 60/456,260, filed on Mar. 20, 2003.

(51) Int. Cl.
*G06F 15/16* (2006.01)

(52) U.S. Cl.
USPC ............................ 709/227; 709/228; 709/223

(58) Field of Classification Search
USPC ................. 709/227–228, 223–224, 250, 232, 709/242
See application file for complete search history.

(56) References Cited

U.S. PATENT DOCUMENTS

| 4,333,020 A | 6/1982 | Maeder |
| 4,395,774 A | 7/1983 | Rapp |
| 4,433,378 A | 2/1984 | Leger |
| 4,445,051 A | 4/1984 | Elmasry |
| 4,449,248 A | 5/1984 | Leslie |

(Continued)

FOREIGN PATENT DOCUMENTS

| EP | 0465090 B1 | 4/1996 |
| EP | 0692892 B1 | 4/2003 |

(Continued)

OTHER PUBLICATIONS

Defendant Emulex Corporation's Disclosure of Preliminary Invalidity Contentions, with Exhibit F, *Broadcom Corporation* vs. *Emulex Corporation*, Case No. SACV 09-1058-JVS (ANx), Jun. 28, 2010.

(Continued)

*Primary Examiner* — Philip B Tran
(74) *Attorney, Agent, or Firm* — Thomas | Horstemeyer, LLP.

(57) ABSTRACT

A network interface device may include an offload engine that receives control of state information while a particular connection is offloaded. Control of the state information for the particular connection may be split between the network interface device and a host. The at least one connection variables may be updated and provided to the host.

20 Claims, 4 Drawing Sheets

(56) References Cited

U.S. PATENT DOCUMENTS

| | | |
|---|---|---|
| 4,463,424 A | 7/1984 | Mattson |
| 4,519,068 A | 5/1985 | Krebs |
| 4,545,023 A | 10/1985 | Mizzi |
| 4,590,550 A | 5/1986 | Eilert |
| 4,599,526 A | 7/1986 | Paski |
| 4,649,293 A | 3/1987 | Ducourant |
| 4,680,787 A | 7/1987 | Marry |
| 4,717,838 A | 1/1988 | Brehmer |
| 4,721,866 A | 1/1988 | Chi |
| 4,727,309 A | 2/1988 | Vajdic |
| 4,737,975 A | 4/1988 | Shafer |
| 4,760,571 A | 7/1988 | Schwarz |
| 4,761,822 A | 8/1988 | Maile |
| 4,777,657 A | 10/1988 | Gillaspie |
| 4,791,324 A | 12/1988 | Hodapp |
| 4,794,649 A | 12/1988 | Fujiwara |
| 4,804,954 A | 2/1989 | Macnak |
| 4,806,796 A | 2/1989 | Bushey |
| 4,807,282 A | 2/1989 | Kazan |
| 4,817,054 A | 3/1989 | Banerjee |
| 4,817,115 A | 3/1989 | Campo |
| 4,821,034 A | 4/1989 | Anderson |
| 4,850,009 A | 7/1989 | Zook |
| 4,890,832 A | 1/1990 | Komaki |
| 4,894,792 A | 1/1990 | Mitchell |
| 4,916,441 A | 4/1990 | Gombrich |
| 4,964,121 A | 10/1990 | Moore |
| 4,969,206 A | 11/1990 | Desrochers |
| 4,970,406 A | 11/1990 | Fitzpatrick |
| 4,977,611 A | 12/1990 | Maru |
| 4,995,099 A | 2/1991 | Davis |
| 5,008,879 A | 4/1991 | Fischer |
| 5,025,486 A | 6/1991 | Klughart |
| 5,029,183 A | 7/1991 | Tymes |
| 5,031,231 A | 7/1991 | Miyazaki |
| 5,033,109 A | 7/1991 | Kawano |
| 5,041,740 A | 8/1991 | Smith |
| 5,055,659 A | 10/1991 | Hendrick |
| 5,055,660 A | 10/1991 | Bertagna |
| 5,079,452 A | 1/1992 | Lain |
| 5,081,402 A | 1/1992 | Koleda |
| 5,087,099 A | 2/1992 | Stolarczyk |
| 5,115,151 A | 5/1992 | Hull |
| 5,117,501 A | 5/1992 | Childress |
| 5,119,502 A | 6/1992 | Kallin |
| 5,121,408 A | 6/1992 | Cai |
| 5,122,689 A | 6/1992 | Barre |
| 5,123,029 A | 6/1992 | Bantz |
| 5,128,938 A | 7/1992 | Borras |
| 5,134,347 A | 7/1992 | Koleda |
| 5,142,573 A | 8/1992 | Umezawa |
| 5,149,992 A | 9/1992 | Allstot |
| 5,150,361 A | 9/1992 | Wieczorek |
| 5,152,006 A | 9/1992 | Klaus |
| 5,153,878 A | 10/1992 | Krebs |
| 5,162,674 A | 11/1992 | Allstot |
| 5,175,870 A | 12/1992 | Mabey |
| 5,177,378 A | 1/1993 | Nagasawa |
| 5,179,721 A | 1/1993 | Comroe |
| 5,181,200 A | 1/1993 | Harrison |
| 5,196,805 A | 3/1993 | Beckwith |
| 5,216,295 A | 6/1993 | Hoang |
| 5,230,084 A | 7/1993 | Nguyen |
| 5,239,662 A | 8/1993 | Danielson |
| 5,241,542 A | 8/1993 | Natarajan |
| 5,241,691 A | 8/1993 | Owen |
| 5,247,656 A | 9/1993 | Kabuo |
| 5,249,220 A | 9/1993 | Moskowitz |
| 5,249,302 A | 9/1993 | Metroka |
| 5,265,238 A | 11/1993 | Canova |
| 5,265,270 A | 11/1993 | Stengel |
| 5,274,666 A | 12/1993 | Dowdell |
| 5,276,680 A | 1/1994 | Messenger |
| 5,278,831 A | 1/1994 | Mabey |
| 5,289,055 A | 2/1994 | Razavi |
| 5,289,469 A | 2/1994 | Tanaka |
| 5,291,516 A | 3/1994 | Dixon |
| 5,293,639 A | 3/1994 | Wilson |
| 5,296,849 A | 3/1994 | Ide |
| 5,297,144 A | 3/1994 | Gilbert |
| 5,301,196 A | 4/1994 | Ewen |
| 5,304,869 A | 4/1994 | Greason |
| 5,315,591 A | 5/1994 | Brent |
| 5,323,392 A | 6/1994 | Ishii |
| 5,329,192 A | 7/1994 | Wu |
| 5,331,509 A | 7/1994 | Kikinis |
| 5,345,449 A | 9/1994 | Buckingham |
| 5,349,649 A | 9/1994 | Iijima |
| 5,355,453 A | 10/1994 | Row |
| 5,361,397 A | 11/1994 | Wright |
| 5,363,121 A | 11/1994 | Freund |
| 5,373,149 A | 12/1994 | Rasmussen |
| 5,373,506 A | 12/1994 | Tayloe |
| 5,390,206 A | 2/1995 | Rein |
| 5,392,023 A | 2/1995 | D'Avello |
| 5,406,615 A | 4/1995 | Miller |
| 5,406,643 A | 4/1995 | Burke |
| 5,418,837 A | 5/1995 | Johansson |
| 5,420,529 A | 5/1995 | Guay |
| 5,423,002 A | 6/1995 | Hart |
| 5,426,637 A | 6/1995 | Derby |
| 5,428,636 A | 6/1995 | Meier |
| 5,430,845 A | 7/1995 | Rimmer |
| 5,432,932 A | 7/1995 | Chen |
| 5,434,518 A | 7/1995 | Sinh |
| 5,437,329 A | 8/1995 | Brooks |
| 5,440,560 A | 8/1995 | Rypinski |
| 5,455,527 A | 10/1995 | Murphy |
| 5,457,412 A | 10/1995 | Tamba |
| 5,459,412 A | 10/1995 | Mentzer |
| 5,465,081 A | 11/1995 | Todd |
| 5,473,607 A | 12/1995 | Hausman |
| 5,481,265 A | 1/1996 | Russell |
| 5,481,562 A | 1/1996 | Pearson |
| 5,488,319 A | 1/1996 | Lo |
| 5,502,719 A | 3/1996 | Grant |
| 5,510,734 A | 4/1996 | Sone |
| 5,510,748 A | 4/1996 | Erhart |
| 5,519,695 A | 5/1996 | Purohit |
| 5,521,530 A | 5/1996 | Yao |
| 5,533,029 A | 7/1996 | Gardner |
| 5,535,373 A | 7/1996 | Olnowich |
| 5,544,222 A | 8/1996 | Robinson |
| 5,548,230 A | 8/1996 | Gerson |
| 5,548,238 A | 8/1996 | Zhang |
| 5,550,491 A | 8/1996 | Furuta |
| 5,576,644 A | 11/1996 | Pelella |
| 5,579,487 A | 11/1996 | Meyerson |
| 5,583,456 A | 12/1996 | Kimura |
| 5,584,048 A | 12/1996 | Wieczorek |
| 5,600,267 A | 2/1997 | Wong |
| 5,603,051 A | 2/1997 | Ezzet |
| 5,606,268 A | 2/1997 | Van Brunt |
| 5,619,497 A | 4/1997 | Gallagher |
| 5,619,650 A | 4/1997 | Bach |
| 5,625,308 A | 4/1997 | Matsumoto |
| 5,628,055 A | 5/1997 | Stein |
| 5,630,061 A | 5/1997 | Richter |
| 5,640,356 A | 6/1997 | Gibbs |
| 5,640,399 A | 6/1997 | Rostoker |
| 5,668,809 A | 9/1997 | Rostoker |
| 5,675,584 A | 10/1997 | Jeong |
| 5,675,585 A | 10/1997 | Bonnot |
| 5,680,038 A | 10/1997 | Fiedler |
| 5,680,633 A | 10/1997 | Koenck |
| 5,689,644 A | 11/1997 | Chou |
| 5,724,361 A | 3/1998 | Fiedler |
| 5,726,588 A | 3/1998 | Fiedler |
| 5,732,346 A | 3/1998 | Lazaridia |
| 5,740,366 A | 4/1998 | Mahany |
| 5,742,604 A | 4/1998 | Edsall |
| 5,744,366 A | 4/1998 | Kricka |
| 5,744,999 A | 4/1998 | Kim |
| 5,748,631 A | 5/1998 | Bergantino |

| | | |
|---|---|---|
| 5,754,549 A | 5/1998 | DeFoster |
| 5,767,699 A | 6/1998 | Bosnyak |
| 5,778,414 A | 7/1998 | Winter |
| 5,796,727 A | 8/1998 | Harrison |
| 5,798,658 A | 8/1998 | Werking |
| 5,802,258 A | 9/1998 | Chen |
| 5,802,287 A | 9/1998 | Rostoker |
| 5,802,465 A | 9/1998 | Hamalainen |
| 5,802,576 A | 9/1998 | Tzeng |
| 5,805,927 A | 9/1998 | Bowes |
| 5,821,809 A | 10/1998 | Boerstler |
| 5,826,027 A | 10/1998 | Pedersen |
| 5,828,653 A | 10/1998 | Goss |
| 5,829,025 A | 10/1998 | Mittal |
| 5,831,985 A | 11/1998 | Sandorfi |
| 5,839,051 A | 11/1998 | Grimmett |
| 5,844,437 A | 12/1998 | Asazawa |
| 5,848,251 A | 12/1998 | Lomelino |
| 5,859,669 A | 1/1999 | Prentice |
| 5,861,881 A | 1/1999 | Freeman |
| 5,875,465 A | 2/1999 | Kilpatrick |
| 5,877,642 A | 3/1999 | Takahashi |
| 5,887,146 A | 3/1999 | Baxter |
| 5,887,187 A | 3/1999 | Rostoker |
| 5,892,382 A | 4/1999 | Ueda |
| 5,892,922 A | 4/1999 | Lorenz |
| 5,893,150 A | 4/1999 | Hagersten |
| 5,893,153 A | 4/1999 | Tzeng |
| 5,903,176 A | 5/1999 | Westgate |
| 5,905,386 A | 5/1999 | Gerson |
| 5,908,468 A | 6/1999 | Hartmann |
| 5,909,127 A | 6/1999 | Pearson |
| 5,909,686 A | 6/1999 | Muller |
| 5,914,955 A | 6/1999 | Rostoker |
| 5,937,169 A | 8/1999 | Connery |
| 5,940,771 A | 8/1999 | Gollnick |
| 5,945,847 A | 8/1999 | Ransijn |
| 5,945,858 A | 8/1999 | Sato |
| 5,945,863 A | 8/1999 | Coy |
| 5,961,631 A | 10/1999 | Devereux |
| 5,969,556 A | 10/1999 | Hayakawa |
| 5,974,508 A | 10/1999 | Maheshwari |
| 5,977,800 A | 11/1999 | Iravani |
| 5,978,379 A | 11/1999 | Chan |
| 5,978,849 A | 11/1999 | Khanna |
| 5,987,507 A | 11/1999 | Creedon |
| 6,002,279 A | 12/1999 | Evans |
| 6,008,670 A | 12/1999 | Pace |
| 6,014,041 A | 1/2000 | Somasekhar |
| 6,014,705 A | 1/2000 | Koenck |
| 6,025,746 A | 2/2000 | So |
| 6,026,075 A | 2/2000 | Linville |
| 6,028,454 A | 2/2000 | Elmasry |
| 6,037,841 A | 3/2000 | Tanji |
| 6,037,842 A | 3/2000 | Bryan |
| 6,038,254 A | 3/2000 | Ferraiolo |
| 6,061,351 A | 5/2000 | Erimli |
| 6,061,747 A | 5/2000 | Ducaroir |
| 6,064,626 A | 5/2000 | Stevens |
| 6,081,162 A | 6/2000 | Johnson |
| 6,094,074 A | 7/2000 | Chi |
| 6,098,064 A | 8/2000 | Pirolli |
| 6,104,214 A | 8/2000 | Ueda |
| 6,111,425 A | 8/2000 | Bertin |
| 6,111,859 A | 8/2000 | Godfrey |
| 6,114,843 A | 9/2000 | Olah |
| 6,118,776 A | 9/2000 | Berman |
| 6,122,667 A | 9/2000 | Chung |
| 6,141,705 A | 10/2000 | Anand |
| 6,151,662 A | 11/2000 | Christie |
| 6,157,623 A | 12/2000 | Kerstein |
| 6,178,159 B1 | 1/2001 | He |
| 6,185,185 B1 | 2/2001 | Bass |
| 6,188,339 B1 | 2/2001 | Hasegawa |
| 6,194,950 B1 | 2/2001 | Kibar |
| 6,202,125 B1 | 3/2001 | Patterson |
| 6,202,129 B1 | 3/2001 | Palanca |
| 6,209,020 B1 | 3/2001 | Angie |
| 6,215,497 B1 | 4/2001 | Leung |
| 6,218,878 B1 | 4/2001 | Ueno |
| 6,222,380 B1 | 4/2001 | Gerowitz |
| 6,223,239 B1 | 4/2001 | Olarig |
| 6,226,680 B1 | 5/2001 | Boucher |
| 6,232,844 B1 | 5/2001 | Talaga |
| 6,243,386 B1 | 6/2001 | Chan |
| 6,247,060 B1 | 6/2001 | Boucher |
| 6,259,312 B1 | 7/2001 | Murtojarvi |
| 6,265,898 B1 | 7/2001 | Bellaouar |
| 6,266,797 B1 | 7/2001 | Godfrey |
| 6,269,427 B1 | 7/2001 | Kuttanna |
| 6,279,035 B1 | 8/2001 | Brown |
| 6,310,501 B1 | 10/2001 | Yamashita |
| 6,324,181 B1 | 11/2001 | Wong |
| 6,332,179 B1 | 12/2001 | Okpisz |
| 6,334,153 B2 | 12/2001 | Boucher |
| 6,345,301 B1 | 2/2002 | Burns |
| 6,349,098 B1 | 2/2002 | Parruck |
| 6,349,365 B1 | 2/2002 | McBride |
| 6,356,944 B1 | 3/2002 | McCarty |
| 6,363,011 B1 | 3/2002 | Hirose |
| 6,366,583 B2 | 4/2002 | Rowett |
| 6,373,846 B1 | 4/2002 | Daniel |
| 6,374,311 B1 | 4/2002 | Mahany |
| 6,385,201 B1 | 5/2002 | Iwata |
| 6,389,479 B1 | 5/2002 | Boucher |
| 6,396,832 B1 | 5/2002 | Kranzler |
| 6,396,840 B1 | 5/2002 | Rose |
| 6,424,194 B1 | 7/2002 | Hairapetian |
| 6,424,624 B1 | 7/2002 | Galand |
| 6,427,171 B1 | 7/2002 | Craft |
| 6,427,173 B1 | 7/2002 | Boucher |
| 6,434,620 B1 | 8/2002 | Boucher |
| 6,438,651 B1 | 8/2002 | Slane |
| 6,459,681 B1 | 10/2002 | Oliva |
| 6,463,092 B1 | 10/2002 | Kim |
| 6,470,029 B1 | 10/2002 | Shimizu |
| 6,484,224 B1 | 11/2002 | Robins |
| 6,496,479 B1 | 12/2002 | Shionazaki |
| 6,535,518 B1 | 3/2003 | Hu |
| 6,538,486 B1 | 3/2003 | Chen |
| 6,564,267 B1 | 5/2003 | Lindsay |
| 6,597,689 B1 | 7/2003 | Chiu |
| 6,606,321 B1 | 8/2003 | Natanson |
| 6,614,791 B1 | 9/2003 | Luciani |
| 6,614,796 B1 | 9/2003 | Black |
| 6,631,351 B1 | 10/2003 | Ramachandran |
| 6,633,936 B1 | 10/2003 | Keller |
| 6,636,947 B1 | 10/2003 | Neal |
| 6,658,599 B1 | 12/2003 | Linam |
| 6,665,759 B2 | 12/2003 | Dawkins |
| 6,681,283 B1 | 1/2004 | Thekkath |
| 6,697,868 B2 | 2/2004 | Craft |
| 6,757,291 B1 | 6/2004 | Hu |
| 6,757,746 B2 | 6/2004 | Boucher |
| 6,765,901 B1 | 7/2004 | Johnson |
| 6,766,389 B2 | 7/2004 | Hayter |
| 6,788,686 B1 | 9/2004 | Khotimsky |
| 6,788,704 B1 | 9/2004 | Lindsay |
| 6,816,932 B2 | 11/2004 | Cho |
| 6,845,403 B2 | 1/2005 | Chadalapaka |
| 6,850,521 B1 | 2/2005 | Kadambi |
| 6,859,435 B1 | 2/2005 | Lee |
| 6,862,296 B1 | 3/2005 | Desai |
| 6,865,158 B2 | 3/2005 | Iwamoto |
| 6,874,054 B2 | 3/2005 | Clayton |
| 6,897,697 B2 | 5/2005 | Yin |
| 6,904,519 B2 | 6/2005 | Anand |
| 6,911,855 B2 | 6/2005 | Yin |
| 6,912,603 B2 | 6/2005 | Kanazashi |
| 6,927,606 B2 | 8/2005 | Kocaman |
| 6,937,080 B2 | 8/2005 | Hairapetian |
| 6,938,092 B2 | 8/2005 | Burns |
| 6,971,006 B2 | 11/2005 | Krishna |
| 6,976,205 B1 | 12/2005 | Ziai |
| 6,982,583 B2 | 1/2006 | Yin |
| 7,007,103 B2 | 2/2006 | Pinkerton |
| 7,009,985 B2 | 3/2006 | Black |
| 7,149,819 B2 | 12/2006 | Petty |

| Patent Number | Date | Inventor |
|---|---|---|
| 7,181,531 B2 | 2/2007 | Pinkerton |
| 7,185,266 B2 | 2/2007 | Blightman |
| 7,212,534 B2 | 5/2007 | Kadambi |
| 7,313,623 B2 * | 12/2007 | Elzur et al. ............... 709/227 |
| 7,346,701 B2 | 3/2008 | Elzur |
| 7,362,769 B2 | 4/2008 | Black |
| 7,366,190 B2 | 4/2008 | Black |
| 7,376,755 B2 | 5/2008 | Pandya |
| 7,382,790 B2 | 6/2008 | Warren |
| 7,385,972 B2 | 6/2008 | Black |
| 7,397,788 B2 | 7/2008 | Mies |
| 7,397,800 B2 | 7/2008 | Elzur |
| 7,400,639 B2 | 7/2008 | Madukkarumukumana |
| 7,411,959 B2 | 8/2008 | Elzur |
| 7,430,171 B2 | 9/2008 | Black |
| 7,472,156 B2 | 12/2008 | Philbrick |
| 7,515,612 B1 | 4/2009 | Thompson |
| 7,586,850 B2 | 9/2009 | Warren |
| 7,644,188 B2 | 1/2010 | Vlodavsky |
| 2001/0026553 A1 | 10/2001 | Gallant |
| 2001/0037397 A1 | 11/2001 | Boucher |
| 2002/0062333 A1 | 5/2002 | Anand |
| 2002/0078265 A1 | 6/2002 | Frazier |
| 2002/0085562 A1 | 7/2002 | Hufferd |
| 2002/0089927 A1 | 7/2002 | Fischer |
| 2002/0095519 A1 | 7/2002 | Philbrick |
| 2002/0103988 A1 | 8/2002 | Dornier |
| 2002/0130692 A1 | 9/2002 | Hairapetian |
| 2002/0174253 A1 | 11/2002 | Hayter |
| 2002/0190770 A1 | 12/2002 | Yin |
| 2002/0194400 A1 | 12/2002 | Porterfield |
| 2003/0001646 A1 | 1/2003 | Hairapetian |
| 2003/0016628 A1 | 1/2003 | Kadambi |
| 2003/0021229 A1 | 1/2003 | Kadambi |
| 2003/0038809 A1 | 2/2003 | Peng |
| 2003/0046330 A1 | 3/2003 | Hayes |
| 2003/0046418 A1 | 3/2003 | Raval |
| 2003/0051128 A1 | 3/2003 | Rodriguez |
| 2003/0061505 A1 | 3/2003 | Sperry |
| 2003/0067337 A1 | 4/2003 | Yin |
| 2003/0079033 A1 | 4/2003 | Craft |
| 2003/0084185 A1 | 5/2003 | Pinkerton |
| 2003/0105977 A1 | 6/2003 | Brabson |
| 2003/0107996 A1 | 6/2003 | Black |
| 2003/0108050 A1 | 6/2003 | Black |
| 2003/0108058 A1 | 6/2003 | Black |
| 2003/0108060 A1 | 6/2003 | Black |
| 2003/0108061 A1 | 6/2003 | Black |
| 2003/0118040 A1 | 6/2003 | Black |
| 2003/0140124 A1 | 7/2003 | Burns |
| 2003/0169753 A1 | 9/2003 | Black |
| 2003/0172342 A1 | 9/2003 | Elzur |
| 2003/0174720 A1 | 9/2003 | Black |
| 2003/0174721 A1 | 9/2003 | Black |
| 2003/0174722 A1 | 9/2003 | Black |
| 2003/0198251 A1 | 10/2003 | Black |
| 2003/0204631 A1 | 10/2003 | Pinkerton |
| 2003/0204634 A1 | 10/2003 | Pinkerton |
| 2004/0019652 A1 | 1/2004 | Freimuth |
| 2004/0042458 A1 | 3/2004 | Elzur |
| 2004/0042464 A1 | 3/2004 | Elzur |
| 2004/0042483 A1 | 3/2004 | Elzur |
| 2004/0042487 A1 | 3/2004 | Ossman |
| 2004/0044798 A1 | 3/2004 | Elzur |
| 2004/0062245 A1 | 4/2004 | Sharp |
| 2004/0062275 A1 | 4/2004 | Siddabathuni |
| 2004/0081186 A1 | 4/2004 | Warren |
| 2004/0085972 A1 | 5/2004 | Warren |
| 2004/0085994 A1 | 5/2004 | Warren |
| 2004/0093411 A1 | 5/2004 | Elzur |
| 2004/0133713 A1 | 7/2004 | Elzur |
| 2004/0227544 A1 | 11/2004 | Yin |
| 2005/0027911 A1 | 2/2005 | Hayter |
| 2005/0160139 A1 | 7/2005 | Boucher |
| 2005/0165980 A1 | 7/2005 | Clayton |
| 2005/0184765 A1 | 8/2005 | Hairapetian |
| 2005/0185654 A1 | 8/2005 | Zadikian |
| 2005/0216597 A1 | 9/2005 | Shah |
| 2005/0278459 A1 | 12/2005 | Boucher |
| 2006/0165115 A1 | 7/2006 | Warren |
| 2006/0176094 A1 | 8/2006 | Hairapetian |
| 2007/0170966 A1 | 7/2007 | Hairapetian |
| 2007/0171914 A1 | 7/2007 | Kadambi |
| 2007/0237163 A1 | 10/2007 | Kadambi |
| 2008/0025315 A1 | 1/2008 | Elzur |
| 2008/0095182 A1 | 4/2008 | Elzur |
| 2008/0151922 A1 | 6/2008 | Elzur |
| 2008/0205421 A1 | 8/2008 | Black |
| 2008/0276018 A1 | 11/2008 | Hayter |
| 2008/0298369 A1 | 12/2008 | Elzur |
| 2009/0074408 A1 | 3/2009 | Black |
| 2009/0128380 A1 | 5/2009 | Hairapetian |

FOREIGN PATENT DOCUMENTS

| | | |
|---|---|---|
| EP | 1345382 A2 | 9/2003 |
| EP | 1357721 A2 | 10/2003 |
| EP | 1460804 A2 | 9/2004 |
| EP | 1460805 A2 | 9/2004 |
| EP | 1460806 A2 | 9/2004 |
| EP | 1206075 B1 | 11/2007 |
| EP | 1537695 B1 | 2/2009 |
| FR | 2725573 A1 | 11/1994 |
| FR | 19940012105 | 4/1996 |
| JP | 6232872 | 8/1994 |
| JP | 9006691 | 1/1997 |
| JP | 1188301 | 3/1999 |
| WO | WO99/00948 | 1/1999 |
| WO | WO00/56013 | 9/2000 |
| WO | WO02/35784 | 5/2002 |
| WO | WO03/079612 | 9/2003 |

OTHER PUBLICATIONS

Defendant Emulex Corporation's First Amended Disclosure of Preliminary Invalidity Contentions, with Exhibit E, *Broadcom Corporation* vs. *Emulex Corporation*, Case No. SACV 09-1058-Jvs (ANx), Aug. 30, 2010.

Emulex Corporation's Answer, Affirmative Defenses, and Counterclaims, Demand for Jury Trial, *Broadcom Corporation* vs. *Emulex Corporation*, Case No. SACV 09-1058-JVS (ANx), Nov. 4, 2009.

User's Guide: Alacritech 1000×4 Quad-Port Server Adapter, Alacritech 100×2 Dual-Port Server Adapter, Alacritech 100x1 Single-Port Server Adapter (4th ed.) (900006r7f), Nov. 2000.

Alacritech 100×4 Quad-Port Server Adapter (Model #2000-100000)[on sale and public use by 2000].

Hardware Installation Guide: Alacritech 100×4 Quad-Port Server Adapter.

Alacritech: Company Milestones.

Alacritech Press Release: Alacritech Ships Industry's First Gigabit Ethernet Accelerator, Oct. 22, 2001.

Raut, Abhay, Verification of a Transport Offload Engine, Dec. 2002.

Gallatin, Andrew, Chase, Jeff, and Yocum, Ken, Trapeze/IP: TCP/IP at Near-Gigabit Speeds, Proceedings of the FREENIX Track: 1999 USENIX Annual Technical Conference, Monterey, CA, Jun. 6-11, 1999.

Buonadonna, Phil, and Culler, David, Queue-Pair IP: A Hybrid Architecture for System Area Networks, Copyright 2002 Intel Corporation, IRB-TR-02-002, Mar. 2002.

Kaiserswerth, Matthias, The Parallel Protocol Engine, IBM Research Division, Zurich Research Laboratory, Switzerland, undated.

Xiao, Xipeng and Lionel, M.Ni, Parallel Routing Table Computation for Scalable IP Routers, undated.

Dunkels, Adam, Minimal TCP/IP Implementation with Proxy Support, SICS Technical Report, ISSN 1100-3154, ISRN: SICS-T-2001/20-SE, Feb. 2001.

Sarkar, Prasenjit and Voruganti, Kaladhar, IP Storage: The Challenge Ahead, IBM Almaden Research Center, San Jose, CA, undated.

Chase, Jeffrey S., Gallatin, Andrew J., and Yocum, Kenneth G., End-System Optimizations for High-Speed TCP, Duke University, Durham, NC, undated.

Wright & Stevens, TCP/IP Illustrated, vol. 2: The Implementation, Corporate Professional Publishing Group, Reading MA 01867, ISBN 0-201-63354-X, 1995, pp. 803-805.

Wright & Stevens, TCP/IP Illustrated, vol. 2: The Implementation, Corporate Professional Publishing Group, Reading MA 01867, ISBN 0-201-63354-X, 1995, pp. 817-818.
Wright & Stevens, TCP/IP Illustrated, vol. 2: The Implementation, Corporate Professional Publishing Group, Reading MA 01867, ISBN 0-201-63354-X, 1995, pp. 790-840.
Ang, An Evaluation of an Attempt at Offloading TCP/IP Protocol Processing Onto an i96ORN-based iNIC, Hewlett Packard, Jan. 9, 2001.
MacLean, R. Andrew, and Barvick, Scott E., An Outboard Processor for High Performance Implementation of Transport Layer Protocols, IEEE Global Telecommunications Conference, Phoenix, AZ, Dec. 2-5, 1991, pp. 1728-1732.
RFC 793, Transmission Control Protocol, DRPA Internet Program, Protocol Specification, Sep. 1981.
Koufopavlou, Odysseas G., and Zitterbart, Martina, Parallel TCP for High Performance Communication System, Globecom '92, IEEE Global Telecommunications Conference, Orlando, FL, Dec. 6-9, 1992, pp. 1395-1399.
Plaintiff Broadcom Corporation's Opening Markman Brief, United States Districk Court, Central District of California, Southern Division, *Broadcom Corporation v. Elulex Corporation*, Case No. SACV09-01058 JVS (ANx), SACV10-03963-JVS (ANx), dated Oct. 18, 2010.
Defendant and Counterclaim Plaintiff Emulex Corporation's Opening Claim Construction Brief, United States District Court, Central District of California, *Broadcom Corporation v. Emulex Corporation*, Case No. SACV09-1058-JVS (ANx) consilidated with CV 10-3963 JVS (ANx), dated Oct. 18, 2010.
Plaintiff Broadcom Corporation's Reply Markman Brief, United States District Court, Central District of California, Southern Division, *Broadcom Corporation v. Emulex Corporation*, Case No. SACV09-01058 JVS (ANx), SACV 1003963-JVS (ANx), dated Nov. 8, 2010.
Defendant and Counterclaim Plaintiff Emulex Corporation's Reply Claim Construction Brief, United States District Court, Central District of California, *Broadcom Corporation v. Emulex Corporation*, Case No. SACV 09-0058-Jvs (ANx) consolidated with CV 10-3963 JVS (ANx), dated Nov. 8, 2010.
Order Regarding Markman/Claim Construction Hearing, United States District Court, Central District of California, *Broadcom Corporation v. Emulex Corporation*, Case No. SACV 09-01058-JVS (ANx) consolidated SACV 10-03963-JVS (Anx), dated Dec. 17, 2010.
Deposition of Frankie Fan—Volume one, United States District Court, Central District of California, Southern Division, *Broadcom Corporation v. Emulex Corporation*, Case No. 09-1058 JVS (ANx), dated Sep. 22, 2010.
Deposition of Frankie Fan—Volume two, United States District Court, Central District of California, Southern Division, *Broadcom Corporation v. Emulex Corporation*, Case No. 09-1058 JVS (ANx), dated Sep. 22, 2010.
Joint Claim Construction and Prehearing Statement Pursuant to N.D. Cal. Patent L.R. 4-3, United States District Court, Central District, Southern Division, *Broadcom Corporation v. Emulex Corporation*, Case No. SACV09-1058 JVS (ANx), SACV 10-03963-JVS (ANx). Exhibit A: Disputed Terms, Proposed Constructions, and Intrinsic and Extrinsic Evidence, *Broadcom Corporation v. Emulex Corporation*, Case No. 8:09-cv-01058-JVS-AN.
European Search Report corresponding to European Patent Application No. 03791992.5-1244, dated Sep. 7, 2010.
Ewen, "Single-Chip 1062 Mbaud CMOS Transceiver for Serial Data communication", 1995 IEEE International Solid-State Circuits Conference, Digest of Technical Papers, First Edition, Feb. 1995, pp. 1-2, 6-13, 32-33, 336, IEEE Catalog No. 95CH35753, Publisher: John H. Wuorinen, Castine, ME 04421.
Fiedler, "A 1.0625Gbps Transceiver with 2x-Oversampling and Transmit Signal Pre-Emphasis", 1997 IEEE International Solid-State Circuits Conference, Digest of Technical Papers, ISSCC97, Session 15, Serial Data Communications, Paper FP 15.1, pp. 238-239, 464.
Fujimori, "A 90-dB SNR 2.5-MHz Output-Rate ADC Using Cascaded Multibit Delta-Sigma Modulation at 8x Oversampling Ratio", IEEE Journal of Solid-State Circuits, vol. 35, No. 12, Dec. 2000, pp. 1820-1828.
Corner, "A CMOS Phase Detector for Mixed Signal ASIC Application", IEEE, 1993, pp. 232-234.
Fiedler, "A CMOS Pulse Density Modulator for High-Resolution A/D Converters", IEEE Journal of Solid-State Circuits, vol. sc-19, No. 6, Dec. 1984, pp. 995-996.
Momtaz, "A Fully Integrated SONET OC-48 Transceiver in Standard CMOS", IEEE Journal of Solid-State Circuits, vol. 36, No. 12, Dec. 2001, pp. 1964-1973.
Schmitt, "A Low Voltage CMOS Current Source", pp. 110-113.
Hairapetian, "An 81-MHz IF Receiver in CMOS", IEEE Journal of Solid-State Circuits, vol. 31, No. 12, Dec. 1996, pp. 1981-1986.
Ang, "An Evaluation of an Attempt at Offloading TCP/IP Protocol Processing Onto an i96ORN-Based iNIC", Hewlett Packard, 2001, pp. 1-33.
Fischer, "CiNIC-Calpoly Intelligent NIC", A Thesis Presented to the Faculty of California Polytechnic State University, San Luis Obispo, Jun. 2001, pp. i-xi, 1-137.
Tanenbaum, Excerpt from Computer Networks, Third Edition, 1996, Publisher: Prentice Hall PTF, Upper Saddle River, New Jersey 07458, pp. 556-558.
Allstot, "Current-Mode Logic Techniques for CMOS Mixed-Mode ASIC's", IEEE Custom Integrated Circuits Conference, 1991, pp. 25.2.1-25.2.4.
Shivam, "EMP: Zero-copy OS-bypass NIC-Driven Gigabit Ethernet Message Passing", SC1001 Nov. 2001, Denver, CO.
Nayfeh, "Exploring the Design Space for a Shared-Cache Multiprocessor", Computer Systems Laboratory, Stanford University, IEEE, 1994, pp. 166-175.
Fibre Channel Arbitration Loop (FC-AL), X3.262-199x, X3T11/Project 960D/Rev. 4.5, working draft proposal, American National Standard for Information Technology, Jun. 1, 1995, pp. i-x, 1-92.
Fibre Channel Physical and Signaling Interface (FC-PH), X3.230-199x, X3T11 Project 755D/Rev. 4.3, working draft proposal, American National Standard for Information Systems, Jun. 1, 1994, pp. i-xxxiv, 1-338, Index.
Yeh, "Introduction to TCP/IP Offload Engine (TOA)", 10 Gigabit Ethernet Alliance, Version 1.0, Apr. 2002.
Sanchez, "Iterations in TCP/IP—Ethernet Network Optimization", a Master's thesis presented to the Faculty of California, Polytechnic State University, San Luis Obispo, Jun. 1999, pp. i-xiii, 1-156.
Allam, "Low Power CMOS Logic Families", IEEE, 1999, pp. 419-422.
Hairapetian, "Low-Temperature Mobility Measurements on CMOS Devices", IEEE Transactions on Electron Devices, vol. 36, No. 8, Aug. 1989, pp. 1448-1455.
Cao, "OC-192 Transmitter and Receiver in Standard 0.18-um CMOS", IEEE Journal of Solid-State Circuits, vol. 37, No. 12, Dec. 2002, pp. 1768-1780.
Series H: Audiovisual and Multimedia Systems, Infrastructure of Audiovisual Services—Systems and Terminal Equipment for Audiovisual Services; Visual Telephone Systems and Equipment for Local Area Networks Which Provide a Non-Guaranteed Quality of Serives, ITU-T Recommendation H.323, Superseded by a more recent version, Nov. 1996, pp. i-v, 1-71, 1.
Pinkerton, "The Case for RDMA", May 29, 2002, pp. 1-27.
Pope, "Tip of the Week: Net-Interface Accelerators Can Help or Hinder", Network Systems Design Line, Feb. 26, 2007, http://www.networksystemsdesignline.com, pp. 1-2.
Dally, "Virtual-Channel Flow Control", IEEE Transactions on Parallel and Distributed Systems, vol. 3, No. 2, Mar. 1992, pp. 194-205.
User's Guide: Alacritech 100×4 Quad-Port Server Adapter and Alacritech 100×2 Dual-Port Server Adapter, (Bates Nos. ELX-PAT-00045223-ELX-PAT-00045268).

* cited by examiner

SYSTEM AND METHOD FOR TCP/IP OFFLOAD INDEPENDENT OF BANDWIDTH DELAY PRODUCT

CROSS-REFERENCE TO RELATED APPLICATIONS/INCORPORATION BY REFERENCE

This application is a continuation of U.S. patent application Ser. No. 11/963,105 filed Dec. 21, 2007, which is a continuation of U.S. patent application Ser. No. 10/652,183 filed Aug. 29, 2003, now U.S. Pat. No. 7,313,623, and makes reference to, claims priority to and claims benefit from: U.S. Provisional Patent Application Ser. No. 60/408,617, entitled "System and Method for TCP/IP Offload" filed on Sep. 6, 2002; and U.S. Provisional Patent Application Ser. No. 60/407,165, filed on Aug. 30, 2002; and U.S. Provisional Patent Application Ser. No. 60/456,260, filed on Mar. 20, 2003.

The above stated application is incorporated herein by reference in its entirety.

FIELD OF THE INVENTION

Certain embodiments of the present invention relate to processing of TCP data and related TCP information. More specifically, certain embodiments relate to a method and system for TCP/IP offload independent of bandwidth delay product.

BACKGROUND OF THE INVENTION

The initial development of transmission control protocol (TCP) was based on networking and processing capabilities that were then currently available. As a result, various fundamental assumptions regarding its operation were prefaced on networking and processor technologies that existed at that time. Among the assumptions on which TCP was prefaced includes the scarcity and high cost of bandwidth and the partially limitless processing resources available by a host processor. With the advent of technologies such as Gigabit Ethernet (GbE), these fundamental assumptions have radically changed to the point where bandwidth is no longer as scarce and expensive and the host processing resources are now regarded a being limited rather than virtually infinite. In this regard, the bottleneck has shifted from the network bandwidth to the host processing bandwidth. Since host processing systems do more than merely providing faster network connections, shifting network resources to provide much faster network connections will do little to address the fundamental change in assumptions. Notably, shifting network resources to provide much faster network connections would occur at the expense of executing system applications, thereby resulting in degradation of system performance.

Although new networking architectures and protocols could be created to address the fundamental shift in assumptions, the new architectures and protocols would still have to provide support for current and legacy systems. Accordingly, solutions are required to address the shift in assumptions and to alleviate any bottlenecks that may result with host processing systems. A transmission control protocol offload engine (TOE) may be utilized to redistribute TCP processing from the host system onto specialized processors which may have suitable software for handling TCP processing. The TCP offload engines may be configured to implement various TCP algorithms for handling faster network connections, thereby allowing host system processing resources to be allocated or reallocated to application processing.

In order to alleviate the consumption of host resources, a TCP connection can be offloaded from a host to a dedicated TCP/IP offload engine (TOE). Some of these host resources may include CPU cycles and subsystem memory bandwidth. During the offload process, TCP connection state information is offloaded from the host, for example from a host software stack, to the TOE. A TCP connection can be in any one of a plurality of states at a given time. To process the TCP connection, TCP software may be adapted to manage various TCP defined states. Being able to manage the various TCP defined states may require a high level of architectural complexity in the TOE.

Offloading state information utilized for processing a TCP connection to the TOE may not necessarily be the best solution because many of the states such as CLOSING, LAST_ACK and FIN_WAIT_2 may not be performance sensitive. Furthermore, many of these non-performance sensitive states may consume substantial processing resources to handle, for example, error conditions and potentially malicious attacks. These are but some of the factors that substantially increase the cost of building and designing the TOE. In addition, a TOE that has control, transferred from the host, of all the state variables of a TCP connection may be quite complex, can use considerable processing power and may require and consume a lot of TOE onboard-memory. Moreover, the TCP connection offloaded to the TOE that has control, transferred from the host, of all the state variables of the TCP connection can be inflexible and susceptible to connection loss.

TCP segmentation is a technology that may permit a very small portion of TCP processing to be offloaded to a network interface card (NIC). In this regard, a NIC that supports TCP segmentation does not truly incorporate a full transmission control processing offload engine. Rather, a NIC that supports TCP segmentation only has the capability to segment outbound TCP blocks into packets having a size equivalent to that which the physical medium supports. Each of the outbound TCP blocks are smaller than a permissible TCP window size. For example, an Ethernet network interface card that supports TCP Segmentation, may segment a 4 KB block of TCP data into 3 Ethernet packets. The maximum size of an Ethernet packet is 1518 bytes inclusive of header and a trailing CRC.

A device that supports TCP segmentation does track certain TCP state information such as the TCP sequence number that is related to the data that the offload NIC is segmenting. However, the device that supports TCP segmentation does not track any state information that is related to inbound traffic, or any state information that is required to support TCP acknowledgements or flow control. A NIC that supports full TCP offload in the established state is responsible for handling TCP flow control, and responsible for handling incoming TCP acknowledgements, and generating outbound TCP acknowledgements for incoming data.

TCP segmentation may be viewed as a subset of TCP offload. TCP segmentation allows the protocol stack or operating system to pass information in the form of blocks of TCP data that has not been segmented into individual TCP packets to a device driver. The block of data may be greater than the size of an Ethernet packet. For instance, the block of data to be segmented could be 4 Kbytes or 16 Kbytes. A network adapter associated with the device driver may acquire the blocks of TCP data, packetize the acquired blocks of TCP data into 1518-byte Ethernet packets and update certain fields in each incrementally created packet. For example, the network adapter may update a corresponding TCP sequence number for each of the TCP packets by incrementing the TCP sequence number for each of the packets. In another example, an IP identification (IP ID) field and flag field would also have to be updated for each packet. One limitation with TCP segmentation is that TCP segmentation may only be done on a block of data that is less than a TCP window size. This is due to the fact that a device implementing TCP segmentation has no influence over TCP flow control. Accordingly, the device implementing TCP flow control only segments outbound TCP packets.

A TCP segmentation device does not examine incoming packets and as such, has no influence over flow control. Any received acknowledgement packet is passed up to the host for processing. In this regard, acknowledgement packets that are utilized for flow control are not processed by the TCP segmentation device. Moreover, a TCP segmentation device does not perform congestion control or "slow-start" and does not calculate or modify any variables that are passed back to the operating system and/or host system processor.

Another limitation with TCP segmentation is that information tracked by TCP segmentation is only information that is pertinent for the lifetime of the TCP data. In this regard, for example, the TCP segmentation device may track TCP segmentation numbers but not TCP acknowledgement (ACK) numbers. Accordingly, the TCP segmentation device tracks only a minimal subset of information related to corresponding TCP data. This limits the capability and/or functionality of the TCP segmentation device. A further limitation with TCP segmentation is that a TCP segmentation device does not pass TCP processed information back to an operating system and/or host processor. This lack of feedback limits the TCP processing that otherwise may be achieved by an operating system and/or host system processor.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention may be found in, for example, systems and methods that provide TCP/IP offload. In one embodiment of the invention, a system for TCP/IP offload may include, for example, a host and a TCP/IP offload engine (TOE). The host may be coupled to the TOE. The host may transfer control of at least a portion of TCP connection variables associated with the TCP connection to the TOE. The TOE may update at least a portion of the TCP connection variables and transfer or feedback the updated TCP connection variables back to the host.

In accordance with another embodiment of the invention, a system is provided for TCP connection offload. The system may include, for example, a host and a network interface card (NIC) that may be coupled to the host. For a particular connection offloaded to the NIC, control of state information is split between the host and the NIC. Accordingly, information may be transferred to the NIC and the NIC may update at least a portion of the transferred information. Subsequently, the NIC may transfer at least a portion of the updated information back to the host where the host may utilize this information to manage this and/or another connection.

In another embodiment, the invention may provide a method for TCP/IP offload. The method may include, for example, one or more of the following: deciding to offload a particular TCP connection from a host to a TOE; transferring control of at least a portion of connection variables associated with the particular TCP connection from the host to the TOE; sending a snapshot of remaining connection variables whose control was not transferred to the TOE; and managing the particular TCP connection via the TOE using the connection variables transferred to the TOE and/or using the snapshot. At least a portion of updated connection variables and/or snapshot variables associated with the TCP connection may be transferred back to the host for processing by the host.

Another embodiment of TCP/IP offload method may include, for example, one or more of the following: deciding to offload an established TCP connection from a host to a TOE; transferring control of segment-variant variables to the TOE from the host; sending a snapshot of segment-invariant variables and connection-invariant variables to the TOE; and independently processing incoming TCP packets via the TOE based upon the segment-variant variables and the snapshot. The TOE may update at least a portion of the segment-variant variables and snapshot and transfer at least portions of the segment-variant variables and the snapshot back to the host. In an embodiment of the invention, the host may handle all TCP states except possibly for the ESTABLISHED state which may be offloaded to the TOE.

The invention may also include a method that processes a TCP connection, which may include, for example, one or more of the following: establishing the TCP connection; sharing a control plane for the TCP connection between a host and a TOE; and communicating updated TCP connection variables from the TOE back to the host. Accordingly, at least a portion of the updated TCP connection variables may be utilized to control the TCP connection and/or another TCP connection.

In another embodiment of the invention, a method for TCP offload may include acquiring TCP connection variables from a host and managing at least one TCP connection using the acquired TCP connection variables. At least a portion of the acquired TCP connection variables may be updated and at least some of the updated TCP connection variables may be transferred back to the host. The TCP connection variables may be independent of bandwidth delay product. At least a portion of the updated TCP connection variables may be utilized by the host to process the TCP connection or another TCP connection. A stack may be utilized to transfer the TCP connection variables between at least the host and a TOE. In this regard, the TOE may pull the TCP connection variables from the stack and the host may push the TCP connection variables onto the stack. Also, the updated TCP connection variables may be placed on the stack by the TOE and the host may subsequently pull the updated TCP connection variables from the stack.

The invention may also provide a machine-readable storage, having stored thereon, a computer program having at least one code section for providing TCP offload. The at least one code section may be executable by a machine for causing the machine to perform steps which may include acquiring TCP connection variables from a host and managing at least one TCP connection using the acquired TCP connection variables. At least a portion of the acquired TCP connection variables may be updated and transferred back to the host. The TCP connection variables may be independent of bandwidth delay product. The machine-readable storage may further include code for utilizing at least a portion of the updated TCP connection variables to process the TCP connection or another TCP connection. In another aspect of the invention, the machine-readable storage may include code for pulling the TCP connection variables from a stack, code for pushing updated TCP connection variables onto the stack, and code for pulling connection variables from the stack.

These and other advantages, aspects and novel features of the present invention, as well as details of an illustrated embodiment thereof, will be more fully understood from the following description and drawings.

DETAILED DESCRIPTION OF THE INVENTION

Figure 1:
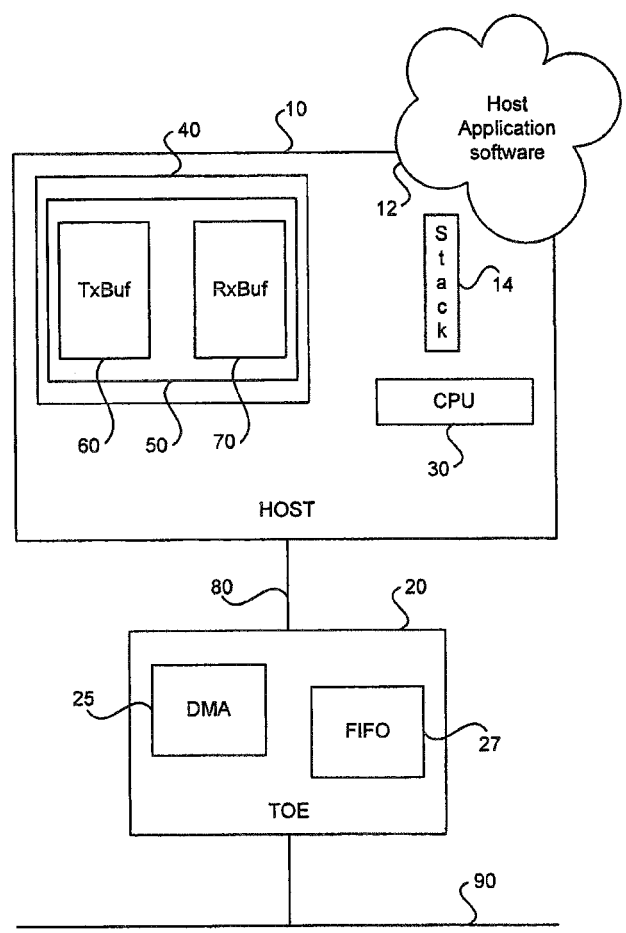
FIG. 1 is a block diagram of a system that provides TCP/IP offload in accordance with an embodiment of the invention.

Certain aspects of the invention may provide a method for TCP offload, which may include acquiring TCP connection variables from a host and managing at least one TCP connection using the acquired TCP connection variables. At least a portion of the acquired TCP connection variables may be updated and at least some of the updated TCP connection variables may be transferred back to the host. In accordance with an aspect of the invention, the TCP connection variables may be variables that are independent of bandwidth delay product. At least a portion of the updated TCP connection variables may be utilized by the host to process the TCP connection or another TCP connection. A stack may be utilized to transfer the TCP connection variables between at least the host and a TOE. In this regard, the host may push the TCP connection variables onto the stack and the TOE may pull the TCP connection variables from the stack. Also, the updated TCP connection variables may be placed on the stack by the TOE and the host may subsequently pull the updated TCP connection variables from the stack.

With regard to TCP segmentation, each of the outbound TCP blocks are smaller than a permissible TCP window size utilized for TCP segmentation. However, the invention is not limited in this regard. Accordingly, in an aspect of the invention, a TOE device may have the capability to provide much further TCP processing and offload than a device that simply supports TCP segmentation. Various aspects of the invention may overcome the TCP segmentation limitation in which TCP segmentation may only be done on a block of data that is less than a TCP window size. In this regard, in order to overcome this limitation, in accordance with an aspect of the invention, since the TOE supports management of TCP flow control, the TOE may be adapted to segment large blocks of data down to the individual packets. The TOE may ensure that transmissions were scheduled such that the sender never sent data beyond the TCP window. Additionally, packetization in accordance with an embodiment of the invention may be done beyond the TCP window size. The TOE takes incoming received packets that are acknowledgement packets for the outbound TCP data stream and acknowledges those outbound packets. If the acknowledgement packet causes the window size to increase, then more packets may be sent out by the TOE device in accordance with an aspect of the invention.

Although TCP segmentation is a transmit-only related technology that does limited TCP processing of transmitted packets, the TOE in accordance with various embodiments of the invention is not so limited. In this regard, the TOE in accordance with an embodiment of the invention may process and manage both transmitted and received packets. Furthermore, a much broader range of TCP processing and management may be done by the TOE in accordance with the invention than with a TCP segmentation device. For example, with TOE, TCP information may be passed to a NIC from an operating system and/or host system processor in such a manner that the NIC maybe be viewed as the owner of the TCP connection. The NIC may then manage and update the TCP state information, which may include but is not limited to, TCP segment numbers and acknowledgment numbers. Subsequent to the processing and/or updating of the TCP state information, the processed and/or updated information may be passed back to an operating system and/or host system processor. The host or system processor may then utilize the information passed back to it from the NIC. Notably, TCP segmentation does not provide this feedback of information to the host system processor and/or operating system.

Certain embodiments of the invention may also provide a robust and efficient transmission control protocol/internet protocol (TCP/IP) offload scheme that may be adapted, for example, to allow the partition of TCP processing between a TCP/IP offload engine (TOE) and a host TCP/IP implementation. The host TCP/IP implementation may include one or more host TCP/IP applications and one or more host processors. For example, in one aspect of the invention, the TCP offload scheme may offload the connections that are in an ESTABLISHED state to the TOE. In other words, aspects of the invention may include the offloading of corresponding TCP state variables that may be utilized, for example, during the ESTABLISHED state. Accordingly, the TCP/IP offload scheme may split a TCP control plane between the host software and the TOE. The TOE may be designed, for example, to implement a subset or a minimum subset of the TCP control plane which may be less complex to implement and may utilize less memory. The TOE, which may be adapted to such an offload scheme, may be implemented in a cost effective manner. The more complicated aspects of TCP connection management may be handled, for example, by the host software and may provide greater reliability and flexibility.

FIG. 1 is a block diagram of a system that provides TCP/IP offload in accordance with an embodiment of the invention. Referring to FIG. 1, the system may include, for example, a host 10, host application software 12 and a TOE 20. The host 10 may include, for example, a host CPU 30 and a host memory 40. The host memory 40 may be adapted to include, for example, an application buffer 50. The application buffer 50 may be adapted to include, for example, a transmission application buffer (TxBuf) 60 and a receive application buffer (RxBuf) 70. The TOE 20 may include, for example, a direct memory access (DMA) engine 25 and a FIFO buffer 27.

The host 10 may be coupled to the TOE 20 via a host interface 80. The host interface may include, but is not limited to a peripheral component interconnect (PCI) bus, PCI-X bus, ISA, SCSI or any other suitable bus. The TOE 20 may be coupled to a physical communications medium 90. The physical communication medium 90 may be a wired medium, wireless medium or a combination thereof. The physical communication medium 90 may include, but is not limited to, Ethernet and fibre channel. Although illustrated on opposite sides of the host interface 80, the host 10 may be, at least in part, disposed on a network interface card (NIC) that includes the TOE 20. Accordingly, in an aspect of the invention, the TCP state plane may be split between the host 10 and the TOE 20.

In one embodiment, a TCP connection may be completely described, for example, by three different sets of variables. The three sets of variables may be, for example, connection-invariant variables, segment-invariant variables and segment-variant variables. The connection-invariant variables may be constant during the lifetime of the TCP connection. The segment-invariant variables may not change from TCP segment to TCP segment, but may change from time to time during the lifetime of the TCP connection. The segment-variant variables may change from TCP segment to TCP segment.

Connection-invariant variables may include, for example, source IP address, destination IP address, IP time-to-live (TTL), IP type-of-service (TOS), source TCP port number, destination TCP port number, initial send sequence number, initial receive sequence number, send window scaling factor and receive window scaling factor.

Segment-invariant variables may include, but are not limited to, source MAC address, next hop's MAC address, MAC layer encapsulation, effective maximum segment size, keep-alive intervals and maximum allowance and flags such as, for example, nagle algorithm enable and keep-alive enable.

Segment-variant variables may include, but are not limited to, IP packet identifier; send and receive sequence variables such as, for example, sequence number for first un-acked data (SND_UNA), sequence number for next send (SND_NXT), maximum sequence number ever sent (SND_MAX), maximum send window (MAX_WIN), sequence number for next receive (RCV_NXT) and receive window size (RCV_WND). Additional exemplary segment-variant variables may include congestion window variables such as congestion window (SND_CWIN) and slow start threshold (SSTHRESH) round trip time variables which may include, but are not limited to, smoothed round trip time (RTT) and smoothed delta (DELTA). Other exemplary segment-variant variables may include time remaining for retransmission, time remaining for delay acknowledgement, time remaining for keep alive, time remaining for PUSH and TCP state and timestamp.

During operation, if a TCP connection is not offloaded, then at least some of the three sets of variables including the connection-invariant variables, the segment-invariant variables and the segment-variant variables may be owned by the host software of the host 10. If the TCP connection is not offloaded, then the TOE 20 may not have access to these variables. However, once the variables are offloaded, the TOE 20 may be configured to update the variables which may be associated with both transmission and reception and pass the updated transmission and reception variables back to the host 10. In this regard, the TOE may update variables that are independent of TCP delay bandwidth product and pass these updated variables back to the host 10 for processing.

Figure 2:
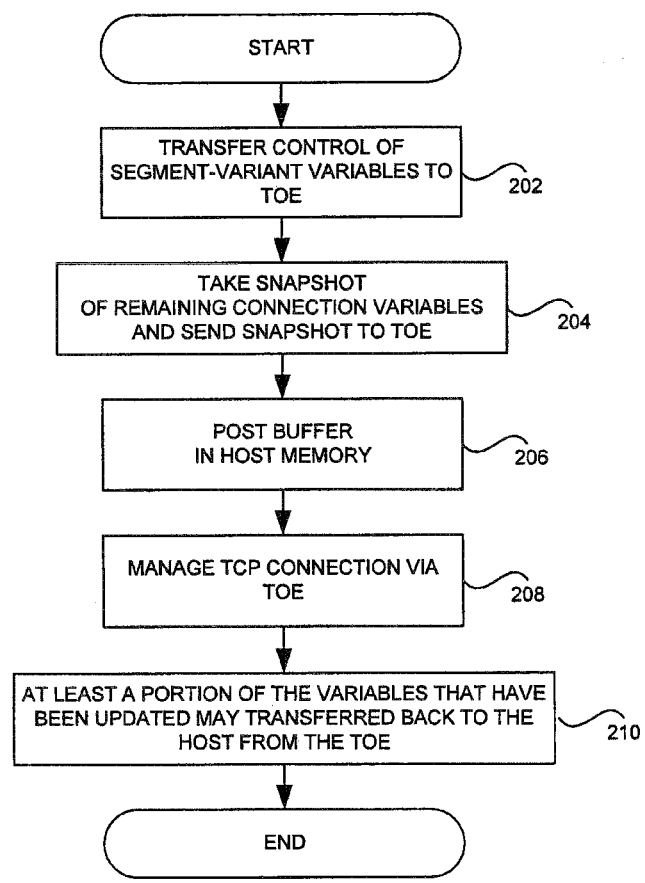
FIG. 2 is a flow chart illustrating exemplary steps for TCP/IP offloading in accordance with an embodiment of the invention.

FIG. 2 is a flow chart illustrating exemplary steps for TCP/IP offloading in accordance with an embodiment of the invention. Referring to FIG. 2, if a connection is offloaded to the TOE 20, then in step 202, the host software may transfer control of the segment-variant variables to the TOE 20. In one example, a portion of the host software protocol control block or TCP control block may be transferred to the TOE 20. In step 204, the host software may take a snapshot of the remaining variables such as the connection-invariant variables and/or the segment invariant variables and send the snapshot to the TOE 20. In one example, the snapshot may be used over and over again by the TOE 20. In step 206, the host software may post a buffer in the host memory 40. For example, the host software may post the application buffer 50 in the host memory 40 and may set up the transmit application buffer (TxBuf) 60 and the receive application buffer (RxBuf) 70 in the application buffer 50. In step 208, the TOE 20 may be responsible for managing the complete TCP connection, including, for example, segmentation, acknowledgement processing, windowing and congestion avoidance. In step 210, at least a portion of the variables that have been updated may be transferred back to the host for processing.

For example, by controlling the segment-variant variables and using the snapshot of the remaining variables, the TOE 20 may process or independently process, incoming TCP segments from the physical communications medium 90 and may place at least a portion such as a payload, of the incoming TCP segments into the host memory 40 via the DMA engine 25. In this regard the incoming TCP segment payload may be placed in the RX application buffer 70 portion of the application buffer 50 via the DMA engine 25.

In one embodiment of the invention, while the TOE 20 may be adapted to manage the complete TCP connection, the TOE 20 may have exclusive read-write access to offloaded segment-variant variables and may exclusively update the offloaded segment-variant variables. The host software or host application software 12 may have read-write access to the segment-invariant variables. The TOE 20 may have read-only access to the segment-invariant variables. If the host application software 12 changes the variables such as the next hop's MAC address, the host application software 12 may notify the TOE 20 by, for example, sending a message to the TOE 20. The TOE 20 may then update the variables. The updated variables may be fed back to the host application software 12 where they may be utilized for TCP processing, for example. Accordingly, the connection-invariant variables may exist in both the host software and the TOE 20.

Figure 3:
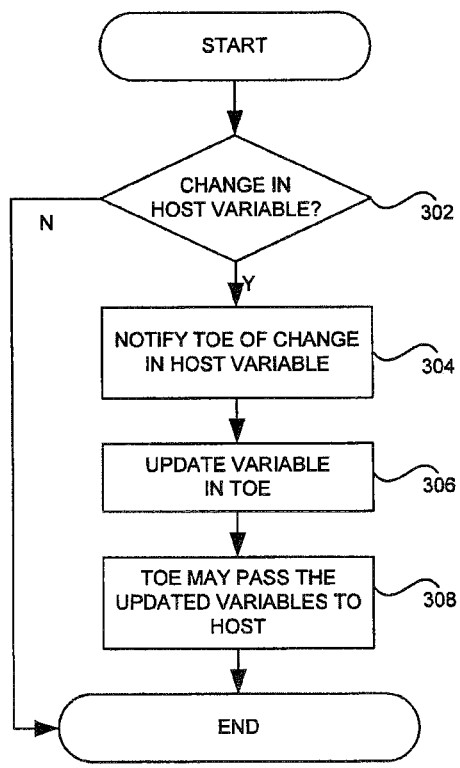
FIG. 3 is a flow chart illustrating exemplary steps for providing TCP/IP offload in accordance with an embodiment of the invention.

FIG. 3 is a flow chart illustrating exemplary steps for providing TCP/IP offload in accordance with an embodiment of the invention. Referring to FIG. 3, in step 302, the host 10 may determine whether one or more of the connection variables such as the segment-invariant variables controlled by the host 10 have changed. For example, the host software may change one or more variables such as a next hop MAC address. If one or more of the connection variables controlled by the host 10 are not changed, then the process may be complete. If one or more of the connection variables controlled by the host 10 are changed, then, in step 304, the host software may notify the TOE 20 of the change in the one or more connection variables controlled by the host 10. In step 306, the TOE 20 may accordingly update one or more of the variables. In step 308, the TOE may pass the updated variables back to the host 10.

Some embodiments according to the present invention may include one or more of the following advantages. Some embodiments may be more reliable and may provide for the uploading of connection from the TOE to the host and offloading of connections from the host to the TOE at any time. Since less state information may be kept by the TOE hardware, uploading and offloading, for example, selected connections can be accelerated. An offloaded connection may be uploaded by returning control of, for example, the segment-variant variables corresponding to the offloaded connection back to the host 10. The uploaded connection may subsequently be offloaded by transferring, for example, the control of the segment-variant variables corresponding to the uploaded connection to the TOE 20.

Figure 4:
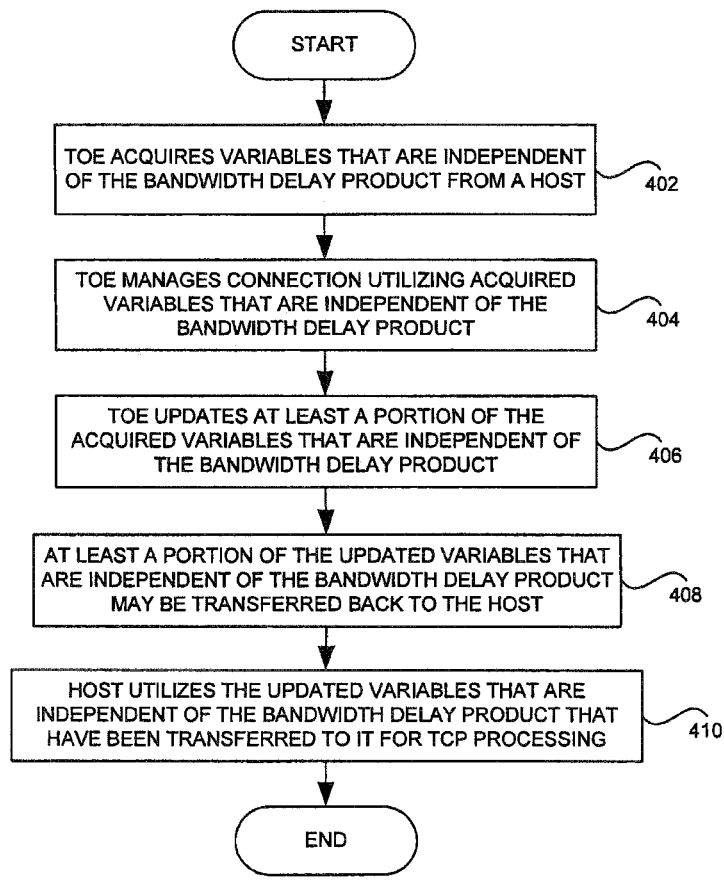
FIG. 4 is a flow chart illustrating exemplary steps that may be utilized for TCP offload in accordance with an embodiment of the invention.

FIG. 4 is a flow chart illustrating exemplary steps that may be utilized for TCP offload in accordance with an embodiment of the invention. Referring to FIG. 4, in step 402, a TOE may acquire or receive variables that are independent of the bandwidth delay product from a host system. In step 404, the TOE may manage the connection utilizing the acquired or received variables that are independent of the bandwidth delay product. In step 406, the TOE may update at least a portion of the acquired variables that are independent of the bandwidth delay product. In step 408, at least a portion of the updated variables that are independent of the bandwidth may be transferred back to the host. In step 410, the host may utilize the updated variables that are independent of the bandwidth delay product that have been transferred to it for TCP processing.

In accordance with an aspect of the invention, a stack 14 (FIG. 1) may be utilized to facilitate the transfer of the variables that are independent of the bandwidth delay product. The stack 14 may be implemented in hardware, software or a combination thereof. Notwithstanding, the TOE 20 (FIG. 1) may be adapted to pull information from the stack 14 and to push updated information onto the stack 14. The host 10 (FIG. 1) may also be adapted to push TCP information onto the stack 14 and to pull the updated information from the stack 14. Accordingly, with reference to step 402 (FIG. 4), the TOE 20 may pull the variables that are independent of the bandwidth delay product from the stack 14. With reference to step 406 (FIG. 4), after the TOE 20 updates the acquired variables that are independent of the bandwidth delay product, the updated variables that are independent of the bandwidth delay product may be pushed onto the stack 14. In this regard, with reference to step 408 (FIG. 4), the host 10 may then pull the updated variables that are independent of the bandwidth delay product from the stack 14.

The TOE may provide a more flexible approach to TCP processing compared to a TCP Segmentation offload device, since the TOE device may facilitate TCP processing on both the received side and the transmit side. Additionally, since the TOE may be adapted to handle receive and transmit variables, the TOE provides a more flexible and efficient methodology for supporting the efficient setup and tear down of network connections.

Certain embodiments of the invention may offer better resistance against denial-of-service (DoS) attacks or other attacks as connection setup may be handled by a host that is more flexible and more powerful than the TOE NIC. In a DoS attack, an attacker attempts to consume as many resources on the targeted or attacked system, thereby preventing the targeted system from providing services to other network devices. The frequent introduction of new attacks may make a flexible host with sufficient memory and CPU power a better choice for running connection setup. The flexible host may be a better choice than, for example, a particular hardware TOE that may have limited code space, computer power, system knowledge and flexibility. In addition, the decision to honor a connection request may, at times, be based upon, for example, sophisticated and dynamic heuristics.

Aspects of the invention may also provide better overall system performance and efficiency. The TOE NIC may be more efficient in handling, for example, connections that are in performance sensitive states of the TCP state machine. In particular, when the TOE NIC handles only connections that are in performance sensitive states of the TCP state machine, additional limited hardware resources may become available. Accordingly, the TOE NIC may be adapted to upload connections that are no longer in performance sensitive states and to offload connections that are in performance sensitive states. Such actions may positively impact such figures of merit such as, for example, hardware TOE efficiency. Other aspects of the invention may be more efficient and may provide better overall system performance because, for example, the host may use flexible, changing, easy-to-update, easy-to-upgrade and more sophisticated algorithms to decide which connections to offload or to upload.

Some embodiments according to the present invention may provide statistics to the host relating to resource utilization. The statistics may include, for example, one or more of the following: available resources; utilization of bandwidth per offloaded connection; number of frames per offloaded connection; errors per offloaded connection; change of state of a transport layer protocol (TLP) such as, for example, TCP, or an upper layer protocol (ULP); trend of utilization such as uptake in rate, slow down, for example; and resource consumption per offloaded connection. The host may use the statistical information at its own discretion to help drive the upload or offload decision process. For example, the host may utilize the statistical information to upload some connections while offloading others. The host may also contemplate other criteria such as modes of operation, computation or network load profiles, presently executed applications and roles in the network, for example. Some of these criteria may be dynamic criteria.

Certain embodiments of the invention may also provide fail-over support from a failed TOE NIC to an operating TOE NIC. Fail-over may include, for example, designating a NIC as having failed when the network cable is unplugged from the network or any other failure of an existing network link. Thus, even though the hardware of one TOE NIC may fail, the connection may still be maintained by transferring state information associated with the failed TOE NIC to another functional TOE NIC. The robustness of the transfer may be further enhanced by part of the connection state information being maintained by the host and part of the connection state information being maintained by the TOE NIC.

Accordingly, the present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A network interface device comprising:
an offload engine; and
a memory that is operable to store at least one attribute of an open connection;
while a connection is open between a first computer and a second computer, the offload engine receives at least one connection state from the first computer, wherein the offload engine is operable to update the at least one connection state;
when the connection is closed, the offload engine is operable to return the connection state to a stack in the first computer.

2. The network interface device of claim 1, wherein attributes of the open connection include an IP address, a port being used, and a packet sequence number.

3. The network interface device of claim 1, wherein connection states from the first computer include performance sensitive connection states and nonperformance sensitive connection states.

4. The network interface device of claim 3, wherein the at least one connection state received by the offload engine includes a performance sensitive connection state.

5. The network interface device of claim 3, wherein at least one nonperformance sensitive connection state is controlled by the first computer while a connection is open between the first computer and the second computer.

6. The network interface device of claim 1, wherein control of at least one connection state is maintained by the first computer, thereby allowing the first computer to provide security against malicious attacks.

7. The network interface device of claim 6, wherein the at least one connection state is associated with connection setup.

8. The network interface device of claim 6, wherein the at least one connection state is non-performance sensitive.

9. The network interface device of claim 1, wherein the offload engine processes incoming data packets.

10. The network interface device of claim 1, wherein the offload engine receives the at least one connection state from the first computer by pulling from the stack in the first computer.

11. The network interface device of claim 1, wherein the offload engine pushes an updated connection state onto the stack in the first computer.

12. The network interface device of claim 1, wherein the offload engine is a TCP/IP offload engine.

13. A method comprising:
storing at least one attribute of a connection that is open between a first computer and a second computer;
receiving, in an offload engine, a connection state from the first computer while the connection is open between the first computer and the second computer,
updating the received connection state; and
returning, by the offload engine, the updated connection state to a stack in the first computer.

14. The method of claim 13, wherein the received connection state corresponds to a performance sensitive connection state.

15. The method of claim 13, wherein the received connection state corresponds to a nonperformance sensitive connection state.

16. The method of claim 13, wherein receiving the connection state from the first computer comprises pulling data from the stack in the first computer.

17. The method of claim 13, further comprising pushing the updated connection state onto the stack in the first computer.

18. A network device comprising:
processing circuitry operable to offload processing to the network device by:
storing at least one attribute of a connection that is open between a first computer and a second computer;
receiving a connection state from the first computer while the connection is open between the first computer and the second computer,
updating the received connection state; and
returning the updated connection state to a stack in the first computer.

19. The network device of claim 18, wherein the receiving the connection state from the first computer comprises pulling data from the stack in the first computer.

20. The network device of claim 18, wherein the processing circuitry is further operable to offload the processing to the network device by pushing the updated connection state onto the stack in the first computer.

* * * * *